(12) United States Patent
Brown et al.

(10) Patent No.: US 6,918,026 B2
(45) Date of Patent: Jul. 12, 2005

(54) EXTERNAL DEVICE TRANSMISSION SYSTEM AND A FAST PATTERN PROCESSOR EMPLOYING THE SAME

(75) Inventors: David A. Brown, Austin, TX (US);
Shannon E. Lawson, Pflugerville, TX (US); Sean W. McGee, Austin, TX (US); Leslie Zsohar, Round Rock, TX (US)

(73) Assignee: Agere Systems Inc., Allentown, PA (US)

( * ) Notice: Subject to any disclaimer, the term of this patent is extended or adjusted under 35 U.S.C. 154(b) by 827 days.

(21) Appl. No.: 09/821,893

(22) Filed: Mar. 30, 2001

(65) Prior Publication Data

US 2002/0141399 A1 Oct. 3, 2002

(51) Int. Cl.[7] .............................................. G06F 13/00
(52) U.S. Cl. ....................................................... 712/34
(58) Field of Search .................. 712/34, 225; 709/230, 709/231, 250; 370/359, 360

(56) References Cited

U.S. PATENT DOCUMENTS 6,078,968 A * 6/2000 Lo et al. ......................... 710/5
6,381,242 B1 * 4/2002 Maher et al. ................ 370/394
6,415,394 B1 * 7/2002 Fruehling et al. ............. 714/30
6,442,669 B2 * 8/2002 Wright et al. .................. 712/19
6,654,373 B1 * 11/2003 Maher et al. ................ 370/392
6,654,389 B1 * 11/2003 Brunheroto et al. ........ 370/535
6,728,839 B1 * 4/2004 Marshall ..................... 711/137

* cited by examiner

*Primary Examiner*—Eric Coleman (57) ABSTRACT

For use with a fast pattern processor having an internal function bus, an external device transmission system, method for transmitting commands to an external device, and a fast pattern processor employing the system and method. In one embodiment, the external device transmission system includes a context memory subsystem that maintains a plurality of argument signature registers, each of the plurality of argument signature registers being associated with a corresponding context and containing a corresponding argument. The external device transmission system also includes a pattern processing engine that dynamically modifies an argument and generates a transmit command as a function of a context associated with the modified argument. The external device transmission system still further includes an output interface subsystem that receives the transmit command, and transmits the modified argument based upon the transmit command to an external device.

21 Claims, 6 Drawing Sheets

EXTERNAL DEVICE TRANSMISSION SYSTEM AND A FAST PATTERN PROCESSOR EMPLOYING THE SAME

TECHNICAL FIELD OF THE INVENTION

The present invention is directed, in general, to a communications system and, more specifically, to an external device transmission system, method for transmitting commands to an external device, and a fast pattern processor employing the system and method.

BACKGROUND OF THE INVENTION

Communications networks are currently undergoing a revolution brought about by the increasing demand for real-time information being delivered to a diversity of locations. Many situations require the ability to transfer large amounts of data across geographical boundaries with increasing speed and accuracy. However, with the increasing size and complexity of the data that is currently being transferred, maintaining the speed and accuracy is becoming increasingly difficult.

Early communications networks resembled a hierarchical star topology. All access from remote sites was channeled back to a central location where a mainframe computer resided. Thus, each transfer of data from one remote site to another, or from one remote site to the central location, had to be processed by the central location. This architecture is very processor-intensive and incurs higher bandwidth utilization for each transfer. This was not a major problem in the mid to late 1980s where fewer remote sites were coupled to the central location. Additionally, many of the remote sites were located in close proximity to the central location. Currently, hundreds of thousands of remote sites are positioned in various locations across assorted continents. Legacy networks of the past are currently unable to provide the data transfer speed and accuracy demanded in the marketplace of today.

In response to this exploding demand, data transfer through networks employing distributed processing has allowed larger packets of information to be accurately and quickly distributed across multiple geographic boundaries. Today, many communication sites have the intelligence and capability to communicate with many other sites, regardless of their location. This is typically accomplished on a peer level, rather than through a centralized topology, although a host computer at the central site can be appraised of what transactions take place and can maintain a database from which management reports are generated and operation issues addressed.

Distributed processing currently allows the centralized site to be relieved of many of the processor-intensive data transfer requirements of the past. This is typically accomplished using a data network, which includes a collection of routers. The routers allow intelligent passing of information and data files between remote sites. However, increased demand and the sophistication required to route current information and data files quickly challenged the capabilities of existing routers. Some efficiencies were obtained by employing new types of processors and devices. However, these processors and devices often require special processing structures that typically cause a redesign of the system to accommodate them.

More specifically, function commands determine the basic operations that may be performed within the system. Therefore, determination of the set of function commands is usually a critical parameter in system design since each command typically has rigidly defined fields within a control register. Definition of these function fields dictate hardware designs for the system. Therefore, a change in the structure of these function fields necessitates a change in the system hardware, which usually is not practical. Additionally, fixed function fields may also limit the range of external devices that may be accommodated by the system. This is especially true as the characteristics of these external devices change.

Accordingly, what is needed in the art is a way to enhance the use of functions between different devices employed within a communications system that overcomes the deficiencies of the prior art.

SUMMARY OF THE INVENTION

To address the above-discussed deficiencies of the prior art, the present invention provides for use with a fast pattern processor having an internal function bus, an external device transmission system, method for transmitting commands to an external device, and a fast pattern processor employing the system and method. In one embodiment, the external device transmission system includes a context memory subsystem that maintains a plurality of argument signature registers, each of the plurality of argument signature registers being associated with a corresponding context and containing a corresponding argument. The external device transmission system also includes a pattern processing engine that dynamically modifies an argument and generates a transmit command as a function of a context associated with the modified argument. The external device transmission system still further includes an output interface subsystem that receives the transmit command, and transmits the modified argument based upon the transmit command to an external device.

In another embodiment, the present invention provides a method for transmitting commands to an external device. In one embodiment, the method includes maintaining a plurality of argument signature registers, each of the plurality of argument signature registers being associated with a corresponding context and containing a corresponding argument. The method also includes dynamically modifying an argument, generating a transmit command as a function of a context associated with the modified argument, and transmitting the modified argument based upon the transmit command to an external device.

In another embodiment, the present invention provides a fast pattern processor including, in one embodiment, an internal function bus, an external device transmission system and a data buffer controller. The external device transmission system includes a context memory subsystem that maintains a plurality of argument signature registers, each of the plurality of argument signature registers being associated with a corresponding context and containing a corresponding argument. The external device transmission system also includes a pattern processing engine that dynamically modifies an argument and generates a transmit command as a function of a context associated with the modified argument. The external device transmission system still further includes an output interface subsystem that receives the transmit command, and transmits the modified argument based upon the transmit command to an external device. The data buffer controller stores configuration information into a portion of the context memory subsystem associated with the corresponding context.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
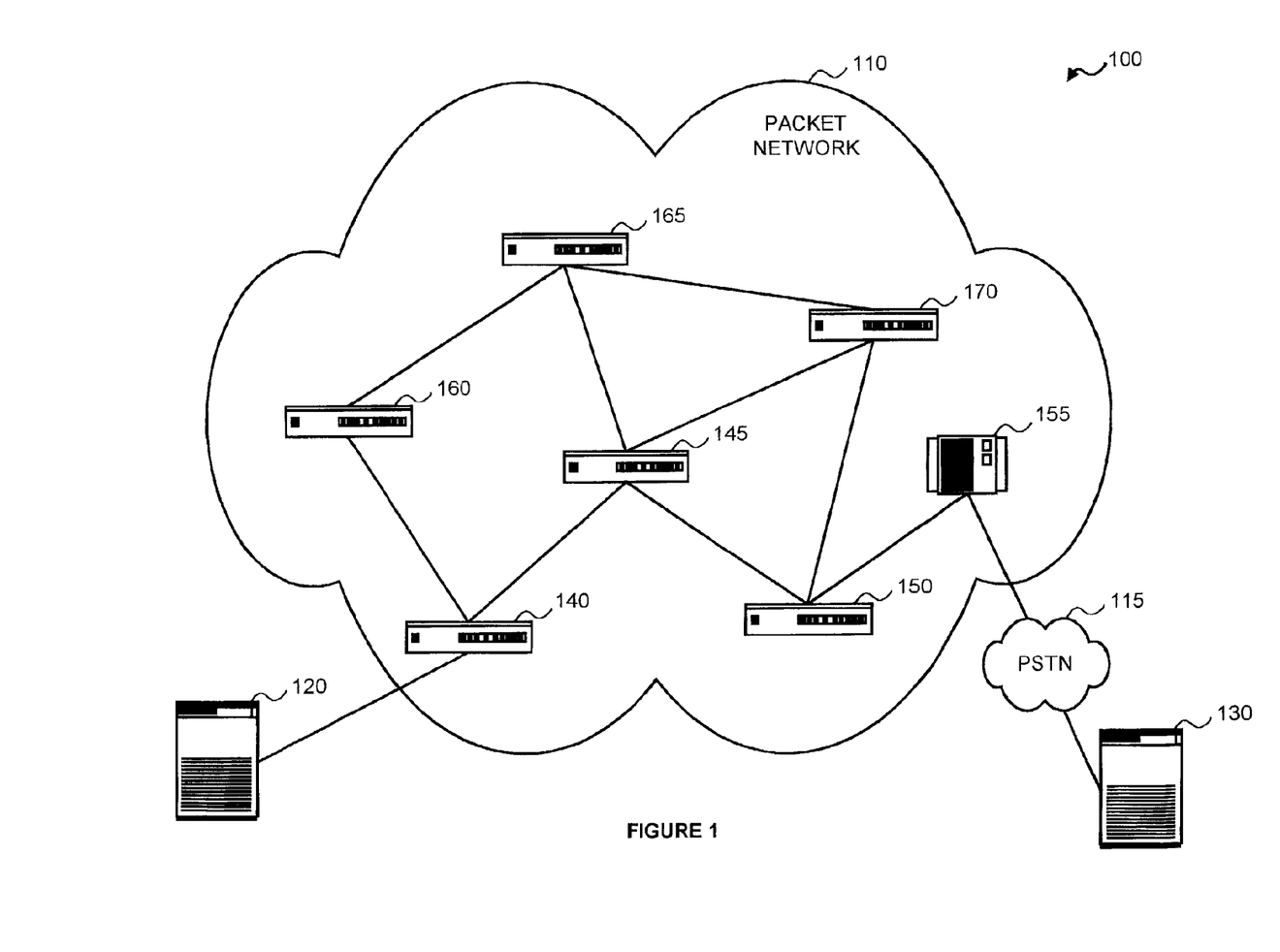
FIG. 1 illustrates a block diagram of an embodiment of a communications network constructed in accordance with the principles of the present invention.

Referring initially to FIG. 1, illustrated is a block diagram of an embodiment of a communications network, generally designated 100, constructed in accordance with the principles of the present invention. The communications network 100 is generally designed to transmit information in the form of a data packet from one point in the network to another point in the network.

As illustrated, the communications network 100 includes a packet network 110, a public switched telephone network (PSTN) 115, a source device 120 and a destination device 130. In the illustrative embodiment shown in FIG. 1, the packet network 110 comprises an Asynchronous Transfer Mode (ATM) network. However, one skilled in the art readily understands that the present invention may use any type of packet network. The packet network 110 includes routers 140, 145, 150, 160, 165, 170 and a gateway 155. One skilled in the pertinent art understands that the packet network 110 may include any number of routers and gateways.

The source device 120 may generate a data packet to be sent to the destination device 130 through the packet network 110. In the illustrated example, the source device 120 initially sends the data packet to the first router 140. The first router 140 then determines from the data packet which router to send the data packet to based upon routing information and network loading. Some information in determining the selection of a next router may include the size of the data packet, loading of the communications link to a router and the destination. In this example, the first router 140 may send the data packet to the second router 145 or fourth router 160.

The data packet traverses from router to router within the packet network 110 until it reaches the gateway 155. In one particular example, the data packet may traverse along a path that includes the first router 140, the fourth router 160, the fifth router 165, the sixth router 170, the third router 150 and finally to the gateway 155. The gateway 155 converts the data packet from the protocol associated with the packet network 110 to a different protocol compatible with the PSTN 115. The gateway 155 then transmits the data packet to the destination device 130 via the PSTN 115. However, in another example, the data packet may traverse along a different path such as the first router 140, the second router 145, the third router 150 and finally to the gateway 155. It is generally desired when choosing a subsequent router, the path the data packet traverses should result in the fastest throughput for the data packet. It should be noted, however, that this path does not always include the least number of routers.

Figure 2:
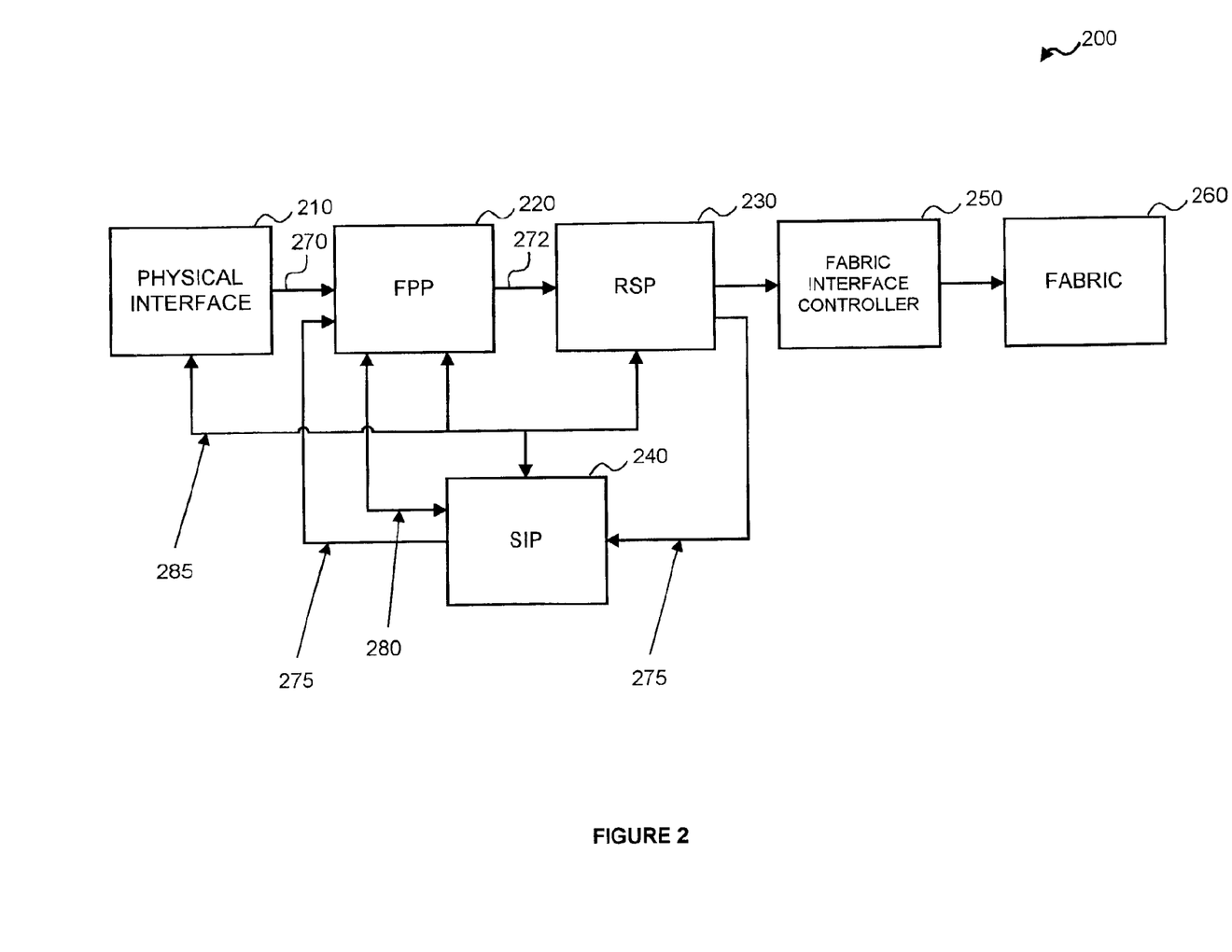
FIG. 2 illustrates a block diagram of an embodiment of a router architecture constructed in accordance with the principles of the present invention.

Turning now to FIG. 2, illustrated is a block diagram of an embodiment of a router architecture, generally designated 200, constructed in accordance with the principles of the present invention. The router architecture 200, in one embodiment, may be employed in any of the routers illustrated in FIG. 1. The router architecture 200 provides a unique hardware and software combination that delivers high-speed processing for multiple communication protocols with full programmability. The unique combination provides the programmability of traditional reduced instruction set computing (RISC) processors with the speed that, until now, only application-specific integrated circuit (ASIC) processors could deliver.

In the embodiment shown in FIG. 2, the router architecture 200 includes a physical interface 210, a fast pattern processor (FPP) 220, a routing switch processor (RSP) 230, and a system interface processor (SIP) 240. The router architecture 200 may also include a fabric interface controller 250 which is coupled to the RSP 230 and a fabric network 260. It should be noted that other components not shown may be included within the router architecture 200 without departing from the scope of the present invention.

The physical interface 210 provides coupling to an external network. In an exemplary embodiment, the physical interface 210 is a POS-PHY/UTOPIA level 3 interface. The FPP 220, in one embodiment, may be coupled to the physical interface 210 and receives a data stream that includes protocol data units (PDUs) from the physical interface 210. The FPP 220 analyzes and classifies the PDUs and subsequently concludes processing by outputting packets to the RSP 230.

The FPP 220, in conjunction with a powerful high-level functional programming language (FPL), is capable of implementing complex pattern or signature recognition and operates on the processing blocks containing those signatures. The FPP 220 has the ability to perform pattern analysis on every byte of the payload plus headers of a data stream. The pattern analysis conclusions may then be made available to a system logic or to the RSP 230, allowing processing block manipulation and queuing functions. The FPP 220 and RSP 230 provide a solution for switching and routing. The FPP 220 further provides glueless interfaces to the RSP 230 and the SIP 240 to provide a complete solution for wire-speed processing in next-generation, terabit switches and routers.

As illustrated in FIG. 2, the FPP 220 employs a first communication link 270 to receive the data stream from the physical interface 210. The first communication link 270 may be an industry-standard UTOPIA Level 3/UTOPIA Level 2/POS-PHY Level 3 interface. Additionally, the FPP 220 employs a second communication link 272 to transmit packet and conclusions to the RSP 230. The second communication link 272 may be a POS-PHY Level 3 interface.

The FPP 220 also includes a management path interface (MPI) 275, a function bus interface (FBI) 280 and a configuration bus interface (CBI) 285. The MPI 275 enables the FPP 220 to receive management frames from a local microprocessor. In an exemplary embodiment, this may be handled through the SIP 240. The FBI 280 connects the FPP 220 and the SIP 240, or custom logic in certain situations, for external processing of function calls. The CBI 285 connects the FPP 220 and other devices (e.g., physical interface 210 and RSP 230) to the SIP 240. Other interfaces (not shown), such as memory interfaces, are also well within the scope of the present invention.

The FPP 220 provides an additional benefit in that it is programmable to provide flexibility in optimizing performance for a wide variety of applications and protocols. Because the FPP is a programmable processor rather than a fixed-function ASIC, it can handle new protocols or applications as they are developed as well as new network functions as required. The FPP 220 may also accommodate a variety of search algorithms. These search algorithms may be applied to large lists beneficially.

The RSP 230 is also programmable and works in concert with the FPP 220 to process the PDUs classified by the FPP 220. The RSP 230 uses the classification information received from the FPP 220 to determine the starting offset and the length of the PDU payload, which provides the classification conclusion for the PDU. The classification information may be used to determine the port and the associated RSP 230 selected for the PDU. The RSP 230 may also receive additional PDU information passed in the form of flags for further processing.

The RSP 230 also provides programmable traffic management including policies such as random early discard (RED), weighted random early discard (WRED), early packet discard (EPD) and partial packet discard (PPD). The RSP 230 may also provide programmable traffic shaping, including programmable per queue quality of service (QoS) and class of service (CoS) parameters. The QoS parameters include constant bit rate (CBR), unspecified bit rate (UBR), and variable bitrate (VBR). Correspondingly, CoS parameters include fixed priority, round robin, weighted round robin (WRR), weighted fair queuing (WFQ) and guaranteed frame rate (GFR).

Alternatively, the RSP 230 may provide programmable packet modifications, including adding or stripping headers and trailers, rewriting or modifying contents, adding tags and updating checksums and CRCs. The RSP 230 may be programmed using a scripting language with semantics similar to the C language. Such script languages are well known in the art. Also connected to the RSP 230 are the fabric interface controller 250 and the fabric network 260. The fabric interface controller 250 provide the physical interface to the fabric 260, which is typically a communications network. The SIP 240 allows centralized initialization and configuration of the FPP 220, the RSP 230 and the physical interfaces 210, 250. The SIP 240, in one embodiment, may provide policing, manage state information and provide a peripheral component interconnect (PCI) connection to a host computer. The SIP 240 may be a PayloadPlus™ Agere System Interface commercially available from Agere Systems, Inc.

Figure 3:
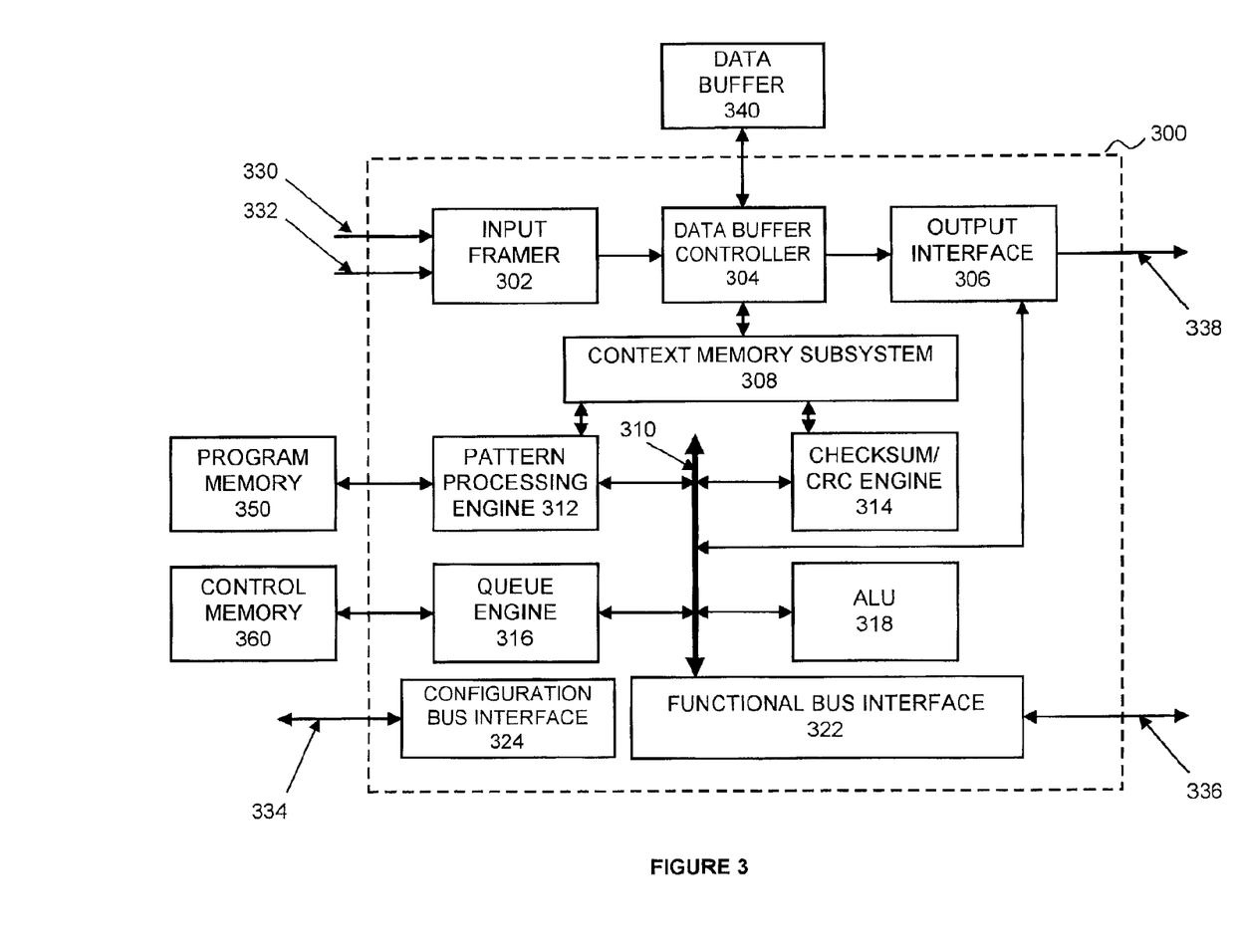
FIG. 3 illustrates a block diagram of an embodiment of a fast pattern processor constructed in accordance with the principles of the present invention.

Turning now to FIG. 3, illustrated is a block diagram of an embodiment of a fast pattern processor (FPP), generally designated 300, constructed in accordance with the principles of the present invention. The FPP 300 includes an input framer 302 that receives PDUs via external input data streams 330, 332. The input framer 302 frames packets containing the PDUs into 64-byte processing blocks and stores the processing blocks into an external data buffer 340. The input data streams 330, 332 may be 32-bit UTOPIA/POS-PHY from PHY and 8-bit POS-PHY management path interface from SIP 240 (FIG. 2), respectively.

Typically, a data buffer controller 304 is employed to store the processing blocks to the external data buffer 340. The data buffer controller 304 also stores the processing blocks and associated configuration information into a portion of a context memory subsystem 308 associated with a context, which is a processing thread. As illustrated, the context memory subsystem 308 is coupled to a data buffer controller 304.

Additionally, the context memory subsystem 308 is coupled to a checksum/cyclical redundancy check (CRC) engine 314 and a pattern processing engine 312. The checksum/CRC engine 314 performs checksum or CRC functions on processing block and on the PDUs embodied with the processing block. The pattern processing engine 312 performs pattern matching to determine how PDUs are classified and processed. The pattern processing engine 312 is coupled to a program memory 350.

The FPP 300 further includes a queue engine 316 and an arithmetic logic unit (ALU) 318. The queue engine 316 manages replay contexts for the FPP 300, provides addresses for block buffers and maintains information on blocks, PDUs, and connection queues. The queue engine 316 is coupled to an external control memory 360 and the internal function bus 310. The ALU 318 is coupled to the internal function bus 310 and is capable of performing associated computational functions.

Also coupled to the internal function bus 310 is a functional bus interface 322. The functional bus interface 322 passes external functional programming language function calls to external logic through a data port 336. In one exemplary embodiment, the data port 336 is a 32-bit connection to the SIP 240 (FIG. 2). The FPP 300 also includes a configuration bus interface 320 for processing configuration requests from externally coupled processors. As illustrated, the configuration bus interface 320 may be coupled to a data port 334, such as an 8-bit CBI source.

Additionally, coupled to the internal function bus 310 is an output interface 306. The output interface 306 sends PDUs and their classification conclusions to the downstream logic. The output interface 306 may retrieve the processing blocks stored in the data buffer 340 and send the PDUs embodied within the processing blocks to an external unit through an output data port 338. The output data port 338, in an exemplary embodiment, is a 32-bit POS-PHY connected to the RSP 230 (FIG. 2).

Figure 4:
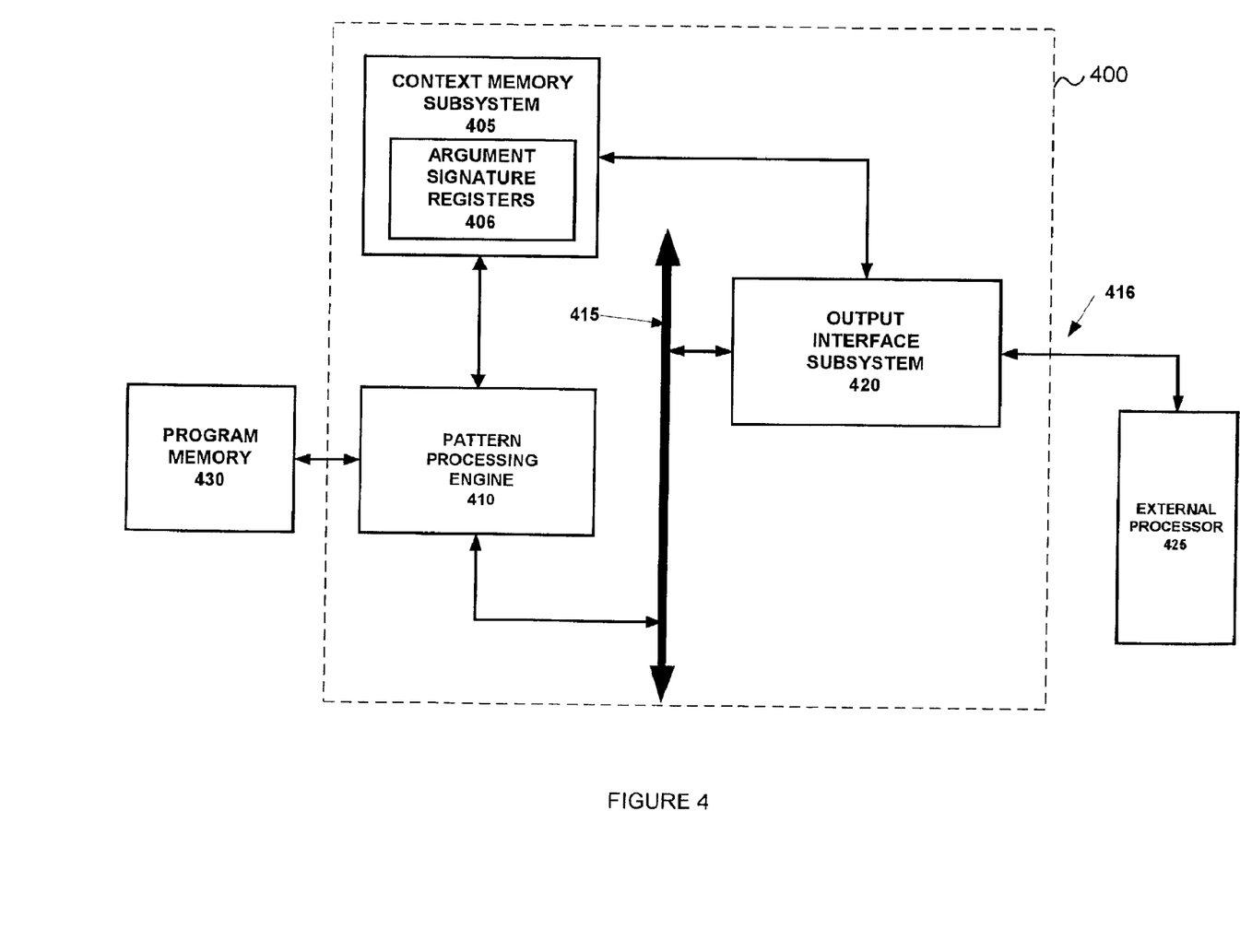
FIG. 4 illustrates a block diagram of an embodiment of an external device transmission system constructed in accordance with the principles of the present invention.

Turning now to FIG. 4, illustrated is a block diagram of an embodiment of an external device transmission system, generally designated 400, constructed in accordance with the principles of the present invention. The external device transmission system 400 may be used with a fast pattern processor having an internal function bus. The external device transmission system 400 includes a context memory subsystem 405 having a plurality of argument signature registers 406, a pattern processing engine 410 employing an internal function bus 415 and an output interface subsystem 420. The pattern processing engine 410 is coupled to a program memory 430, and the output interface subsystem 420 is coupled to an external processor 425 via an output data port 416.

The context memory subsystem 405 is configured to maintain a plurality of argument signature registers 406. Each of the argument signature registers 406 contains a corresponding argument and is associated with a corresponding context. A context is a processing thread used by the FPP. (See FIG. 3 for a discussion of contexts.) A context may also be associated with a processing block stored in a block buffer (not shown) in the context memory subsystem 405. Each processing block may contain at least a portion of a protocol data unit (PDU).

For purposes of the present invention, a "protocol data unit" is the underlying message in a specific protocol that may be transmitted via packets over a network. For example, a protocol data unit may be an Internet Protocol ("IP") message that is transmitted over an Asynchronous Transfer Mode ("ATM") network. In an ATM network, the IP message is broken into ATM cells (packets) before transmission over the ATM network. Of course, however, a protocol data unit may be any protocol message transmitted over a network and a packet may be a portion of the protocol data unit or the entire protocol data unit. The phrase "configured to" is included to mean that the device, the system or the subsystem includes the necessary software, hardware, firmware or a combination thereof to accomplish the stated task.

In the illustrated embodiment, the pattern processing engine 410 employs the program memory 430 and a sequence of operating instructions defined by a functional programing language (FPL) to direct its operation. The functional programming language differs from a procedural programming language, such as C programming language, in that it requires fewer lines of code to perform a function and it is more intuitive in nature. These attributes provide both programming facility and enhanced overall performance.

Additionally, the pattern processing engine 410 is configured to dynamically modify an argument. This modified argument may contain data that is representative of an external device command, a routing parameter and a protocol data unit classification. Of course, these representations are examples of those possible, and the present invention is not limited to these presented. The pattern processing engine is also configured to dynamically modify the modified argument based upon a content of a PDU. Additionally, the pattern processing engine 410 may generate a transmit command as a function of a context associated with the modified argument. This transmit command is sent to the output interface subsystem 420 via the internal function bus 415.

The output interface subsystem 420 receives the transmit command from the internal function bus 415 and transmits the modified argument, based upon the transmit command, to an external device such as the external processor 425. In the illustrated embodiment, the external processor 425 is a routing switch processor. Of course, however, the present invention is not limited to transmitting a transmit command to only one external processor 425. In other embodiments, the present invention may transmit the transmit command to any number of external processors and the transmit command may contain different information depending upon the external processor. In a related embodiment, the output interface subsystem 420 is also configured to transmit portions of a protocol data unit and the modified argument to the external processor 425. Thus, the present invention advantageously provides a generic mechanism for passing arbitrary data to external devices.

Figure 5:
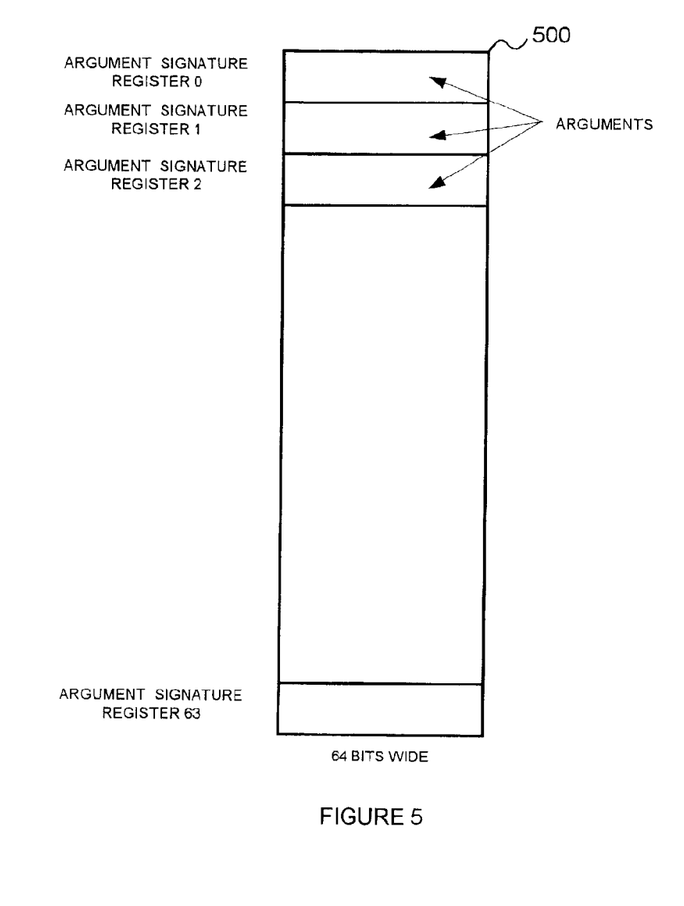
FIG. 5 illustrates a diagram of an embodiment of a plurality of argument signature registers constructed in accordance with the principles of the present invention.

Turning now to FIG. 5, illustrated is a diagram of an embodiment of a plurality of argument signature registers, generally designated 500, constructed in accordance with the principles of the present invention. In the illustrated embodiment, the plurality of argument signature registers 500 include 64 argument signature registers ranging from argument signature register 0 to argument signature register 63. Each of the argument signature registers 0–63 contains an argument that may also be an external device command, a routing parameter, a protocol data unit classification, a queue number, a set of flags, offsets or a string number. Of course, an argument may contain any other type of information or parameter employable by the present invention. Each of the argument signature registers 0–63 will accommodate an argument of 64 bits in width. However, the plurality of argument signature registers 500 is not limited to 64 argument signature registers and a width of 64 bits. Other embodiments of the present invention may have any number of argument signature registers being of any width. In the illustrated embodiment, each of the argument signature registers 0–63 corresponds to a context and is accessed using a context number. Thus, the present invention advantageously allows arguments to be passed between different internal or external co-processors using a context number.

Figure 6:
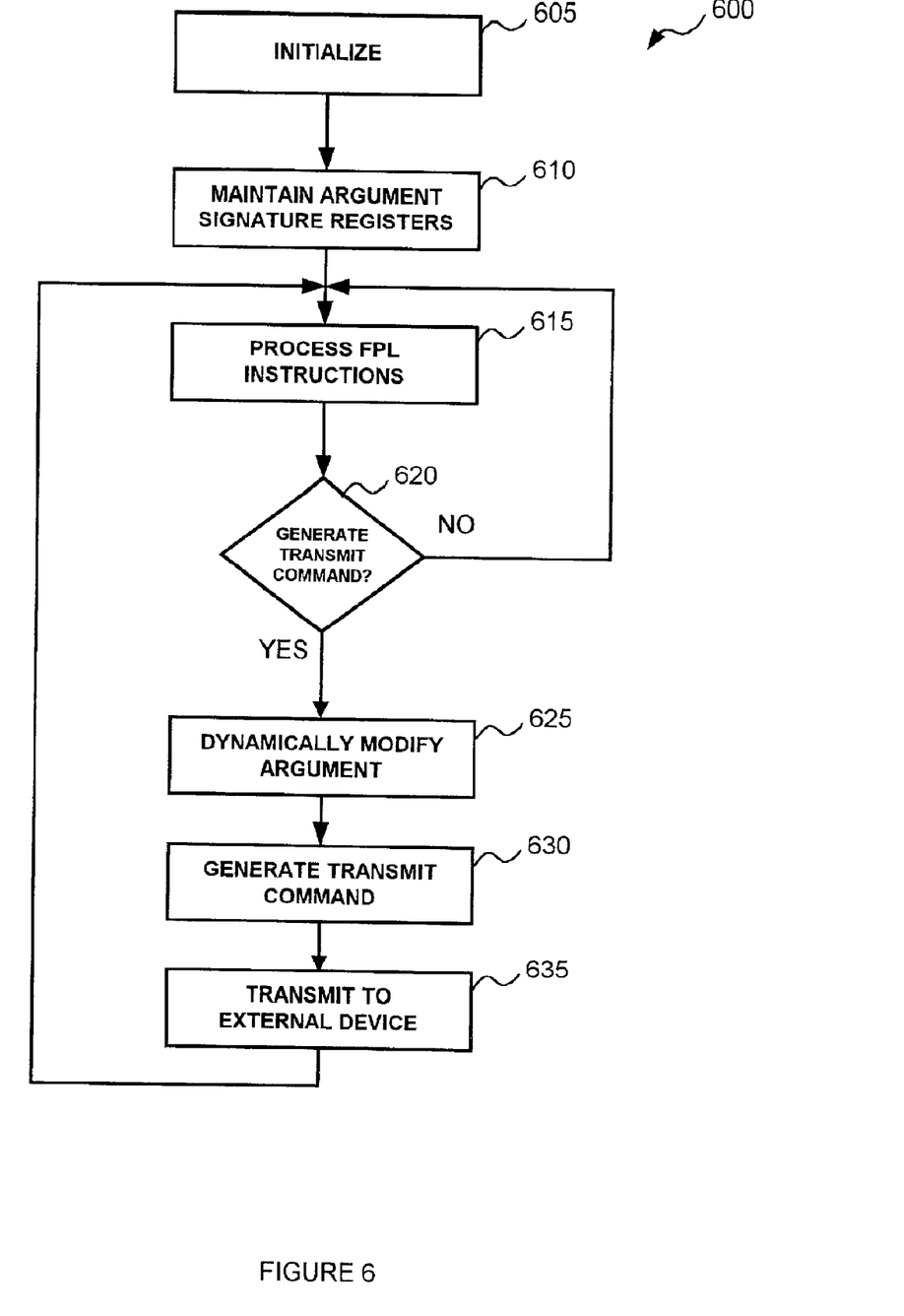
FIG. 6, illustrates a flow diagram of an embodiment of a method for transmitting commands to an external device constructed in accordance with the principles of the present invention.

Turning now to FIG. 6, illustrated is a flow diagram of an embodiment of a method, generally designated 600, for transmitting commands to an external device constructed in accordance with the principles of the present invention. The method 600 may be used with a fast pattern processor having an internal function bus and starts with initialization in a step 605. Then, in a step 610, maintaining a plurality of argument signature registers is accomplished wherein each of the plurality of argument signature registers includes associating a corresponding argument with a corresponding context. The maintaining may also include initializing and or updating each of the argument signature registers. Next, functional programming language (FPL) instructions are processed in a step 615, and a determination is made as to whether a transmit command is to be generated in a first decisional step 620.

If a transmit command is generated in the first decisional step 620, an argument is dynamically modified under the direction of a pattern processing engine associated with the fast pattern processor in a step 625. The method 600 employs a sequence of operating instructions defined by the functional programing language to dynamically modify the argument. The modified argument may contain data selected from the group consisting of an external device command, a routing parameter and a protocol data unit classification. In another embodiment, the modified argument may be dynamically modified based upon a content of a protocol data unit.

Next, the transmit command is generated as a function of a context associated with the modified argument, in a step 630. Then, the modified argument is transmitted to an external device in a step 635. The step 635 may also include transmitting portions of a protocol data unit and the modified argument to the external device, which may be a routing switch processor. In a related embodiment, the method 600 employs an output interface subsystem to transmit the modified argument to the external device. The method 600 then returns to the step 615 for further processing. Alternatively, if the determination was made not to generate a transmit command in the first decisional step 620, the method 600 also returns to the step 615 for further processing.

One skilled in the pertinent art should know that the present invention is not limited to the types of requests described above. Nor is the present invention limited to a sequence of processing. Other embodiments of the present invention may include additional generated command types and may have additional or fewer steps than described above.

Although the present invention has been described in detail, those skilled in the art should understand that they can make various changes, substitutions and alterations herein without departing from the spirit and scope of the invention in its broadest form.

What is claimed is:

1. For use with a fast pattern processor having an internal function bus, an external device transmission system, comprising:
    a context memory subsystem configured to maintain a plurality of argument signature registers, each of said plurality of argument signature registers being associated with a corresponding context and containing a corresponding argument;
    a pattern processing engine configured to dynamically modify an argument and generate a transmit command as a function of a context associated with said modified argument; and
    an output interface subsystem configured to receive said transmit command, and transmit said modified argument based upon said transmit command to an external device.

2. The external device transmission system as recited in claim 1 wherein said modified argument contains data selected from the group consisting of:
    an external device command,
    a routing parameter, and
    a protocol data unit classification.

3. The external device transmission system as recited in claim 1 wherein said pattern processing engine is further configured to generate said transmit command based on said external device.

4. The external device transmission system as recited in claim 1 wherein said output interface subsystem is further configured to transmit portions of a protocol data unit and said modified argument to said external device.

5. The external device transmission system as recited in claim 1 wherein said external device is a routing switch processor.

6. The external device transmission system as recited in claim 1 wherein said pattern processing engine is further configured to dynamically modify said modified argument based upon a content of a protocol data unit.

7. The external device transmission system as recited in claim 1 wherein said pattern processing engine is configured to employ a sequence of operating instructions defined by a functional programing language.

8. For use with a fast pattern processor having an internal function bus, a method for transmitting commands to an external device, comprising:
    maintaining a plurality of argument signature registers, each of said plurality of argument signature registers being associated with a corresponding context and containing a corresponding argument;
    dynamically modifying an argument;
    generating a transmit command as a function of a context associated with said modified argument; and
    transmitting said modified argument based upon said transmit command to an external device.

9. The method as recited in claim 8 wherein said modified argument contains data selected from the group consisting of:
    an external device command,
    a routing parameter, and
    a protocol data unit classification.

10. The method as recited in claim 8 wherein said generating said transmit command is further based on said external device.

11. The method as recited in claim 8 wherein said transmitting further comprises transmitting portions of a protocol data unit and said modified argument to said external device.

12. The method as recited in claim 8 wherein said external device is a routing switch processor.

13. The method as recited in claim 8 wherein said dynamically modifying further comprises dynamically modifying said modified argument based upon a content of a protocol data unit.

14. The method as recited in claim 8 wherein said dynamically modifying employs a sequence of operating instructions defined by a functional programing language.

15. A fast pattern processor, comprising:
    an internal function bus;
    an external device transmission system, including:
        a context memory subsystem that maintains a plurality of argument signature registers, each of said plurality of argument signature registers being associated with a corresponding context and containing a corresponding argument,
        a pattern processing engine that dynamically modifies an argument and generates a transmit command as a function of a context associated with said modified argument, and
        an output interface subsystem that receives said transmit command, and transmits said modified argument based upon said transmit command to an external device; and
    a data buffer controller that stores configuration information into a portion of said context memory subsystem associated with said corresponding context.

16. The fast pattern processor as recited in claim 15 wherein said modified argument contains data selected from the group consisting of:
    an external device command,
    a routing parameter, and
    a protocol data unit classification.

17. The fast pattern processor as recited in claim 15 wherein said pattern processing engine is further configured to generate said transmit command based on said external device.

18. The fast pattern processor as recited in claim 15 wherein said output interface subsystem further transmits portions of a protocol data unit and said modified argument to said external device.

19. The fast pattern processor as recited in claim 15 wherein said external device is a routing switch processor.

20. The fast pattern processor as recited in claim 15 wherein said pattern processing engine further dynamically modifies said modified argument based upon a content of a protocol data unit.

21. The fast pattern processor as recited in claim 15 wherein said pattern processing engine employs a sequence of operating instructions defined by a functional programing language.

* * * * *